United States Patent

Maxon et al.

[11] Patent Number: 5,970,751
[45] Date of Patent: Oct. 26, 1999

[54] FUSED $SIO_2$-$TIO_2$ GLASS METHOD

[75] Inventors: John E. Maxon, Canton; Robert S. Pavlik, Jr., Corning; Daniel R. Sempolinski, Painted Post; Michael H. Wasilewski, Corning, all of N.Y.

[73] Assignee: Corning Incorporated, Corning, N.Y.

[21] Appl. No.: 09/160,251

[22] Filed: Sep. 22, 1998

[51] Int. Cl.⁶ .......................... C03B 19/00; C03B 37/018
[52] U.S. Cl. ................... 65/414; 65/17.4; 501/38
[58] Field of Search ..................... 65/17.3, 17.4, 65/32.4, 60.1, 60.5, 60.8, 414, 416, DIG. 8; 501/38, 53

[56] References Cited

U.S. PATENT DOCUMENTS

| | | | |
|---|---|---|---|
| 2,239,551 | 4/1941 | Dalton et al. | 49/79 |
| 2,272,342 | 2/1942 | Hyde | 49/78.1 |
| 2,326,059 | 8/1943 | Nordberg | 106/52 |
| 5,043,002 | 8/1991 | Dobbins et al. | 65/3.12 |
| 5,152,819 | 10/1992 | Blackwell et al. . | |
| 5,154,744 | 10/1992 | Blackwell et al. . | |
| 5,332,702 | 7/1994 | Sempolinski et al. | 501/106 |
| 5,395,413 | 3/1995 | Sempolinski et al. | 65/414 |

*Primary Examiner*—Stanley S. Silverman
*Assistant Examiner*—Jacqueline A. Ruller
*Attorney, Agent, or Firm*—Milton M. Peterson

[57] ABSTRACT

A method of producing, by flame hydrolysis, a fused silica glass containing titania which comprises delivering a mixture of a silica precursor and a titania precursor in vapor form to a flame, passing the vapor mixture through the flame to form $SiO_2$—$TiO_2$ particles, and depositing the particles within a furnace where they melt to form a solid glass body.

14 Claims, 1 Drawing Sheet

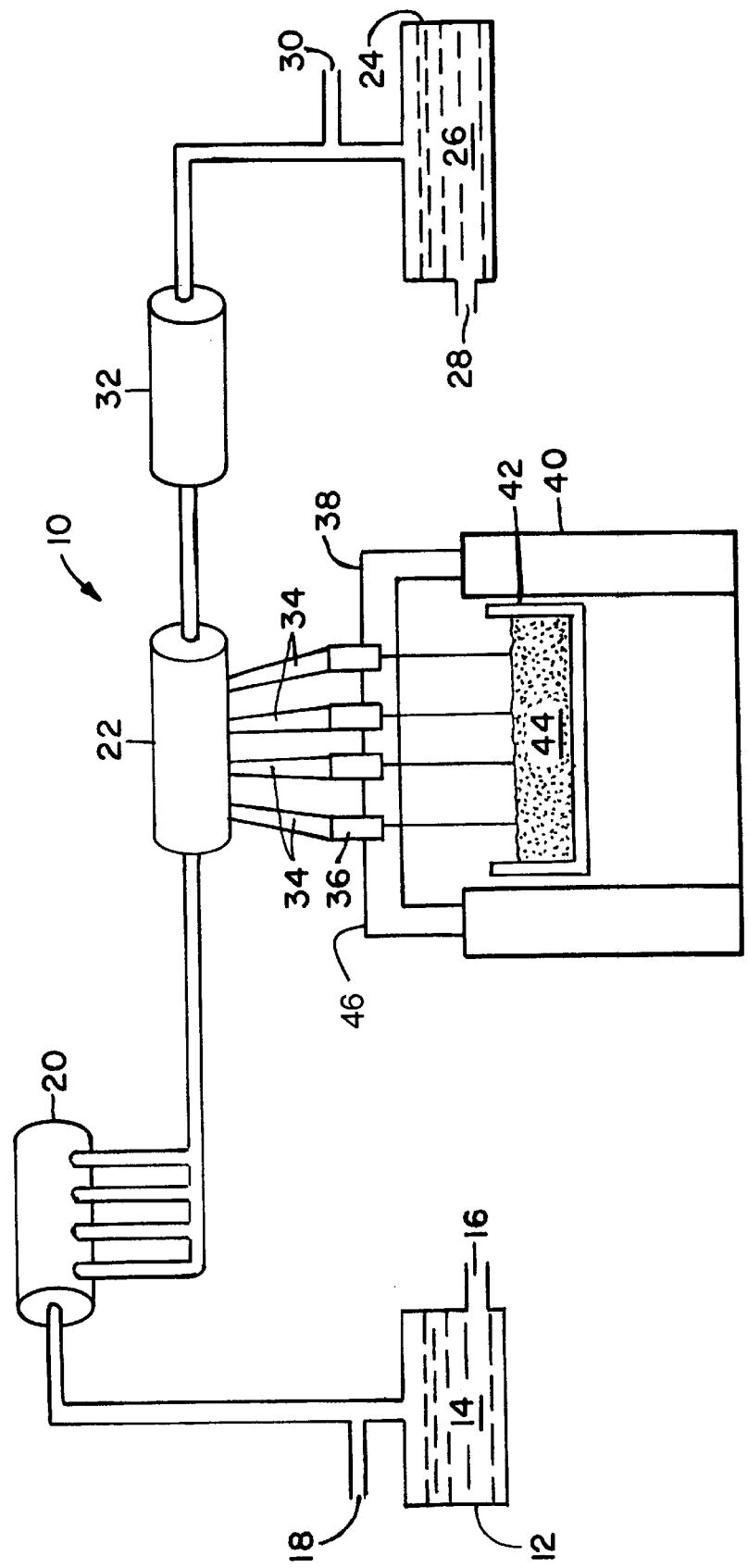

5,970,751

FUSED SIO$_2$-TIO$_2$ GLASS METHOD

FIELD OF THE INVENTION

Method of producing fused silica glasses containing titania.

BACKGROUND OF THE INVENTION

Relatively pure metal oxides are produced by thermal decomposition of precursors and deposition of the resulting oxides. The precursor may take the form of a vapor, or may be carried by a vapor. It may be decomposed by either flame hydrolysis or pyrolysis.

One such process is production of fused silica by hydrolysis or pyrolysis of a silica precursor. Commercially, this is an application of flame hydrolysis involving forming and depositing particles of fused silica which melt to form large bodies (boules). Such boules may be used individually, may be finished and integrated together into large optical bodies, or may be cut into small pieces for finishing as lenses and the like. In this procedure, the precursor is hydrolyzed and the hydrolyzed vapor is passed into a flame to form particles of a fused silica. The particles are continuously deposited, for example, in the cup of a refractory furnace where they melt to form a solid boule.

Essentially pure fused silica finds many diverse applications. However, it does have a small positive coefficient of thermal expansion (CTE) that can make it undesirable in some instances. U.S. Pat. No. 2,326,059 (Nordberg) describes a fused silica doped with 5–11% by weight titania (TiO$_2$). These TiO$_2$-doped glasses have CTEs lower than pure fused silica with the potential for a CTE that approximates 0.

Originally, chlorides of silicon and titanium were employed as precursors. Recently, primarily for environmental reasons, chloride-free precursors have been proposed. Specifically, a siloxane, octamethylcyclotetrasiloxane (OMCTS), and a titanium alkoxide, titanium isopropoxide, Ti(OPri)$_4$, are commercially employed.

The precursors are separately converted to vapor form and carried to mixing manifold by a carrier gas, such as nitrogen. The mixture passes, via fume lines, into a flame where the precursors are converted into SiO$_2$—TiO$_2$ particles. These particles are collected in a refractory furnace where they melt to form a solid boule.

With the changeover to the new precursor materials, problems have been encountered. These problems are manifested largely by material build-ups in the vapor delivery system. The build-ups cause erratic operation, and consequent furnace upsets. Ultimately, they require shut down of the vapor delivery system for cleaning.

It is a basic purpose of this invention to provide an improved method of producing a TiO$_2$-doped fused silica.

Another purpose is to minimize material build-ups that occur in the vapor delivery system during operation.

A further purpose is to improve the quality of the TiO$_2$-doped fused silica produced.

A still further purpose is to lengthen the time of a production run before it is necessary to shut the operation down for cleaning purposes.

SUMMARY OF THE INVENTION

Broadly, the invention resides in a method of producing, by flame hydrolysis, a fused silica glass containing titania which comprises delivering a mixture of a silica precursor and a titania precursor in vapor form to a flame, passing the mixture through the flame to form SiO$_2$—TiO$_2$ particles, and delivering an essentially pure, titanium precursor to the flame.

BRIEF DESCRIPTION OF THE DRAWINGS

The single FIGURE in the accompanying drawing is a schematic representation of a system for practice of the invention.

PRIOR ART

Literature deemed of possible relevance is listed in an accompanying document.

DESCRIPTION OF THE INVENTION

The conventional, boule process used in making fused silica products is a continuous process. In this process, a carrier gas, such as nitrogen, is bubbled through a silica precursor, such as SiCl$_4$, or OMCTS. The carrier gas entrains the precursor in vapor form and transports it to the site of the flame hydrolysis.

Production of a SiO$_2$—TiO$_2$ glass follows the same basic procedure, but a titania precursor is introduced. Essentially, this involves duplicating the delivery system for the silica precursor to provide entrained vapors of the titania precursor. The two separate vapor trains feed into a manifold where they are mixed. The mixture is then carried through fume lines to burners where the flame hydrolysis takes place.

The flame converts the mixture of precursors into particles of TiO$_2$-doped silica, commonly referred to as "soot." The particles form within a refractory furnace having a member in its base known as a cup. The particles are deposited in the cup, and melt to form a solid body referred to as a boule.

The single FIGURE in the accompanying drawing is a schematic representation of a system for use in practicing the present invention. The system is generally designated by the numeral 10.

System 10 includes a source 12 of the silica precursor 14. A carrier gas 16, such as nitrogen, is introduced at or near the base of source 12. A bypass stream of carrier gas is introduced at 18 to prevent saturation of the vaporous stream. The vaporous stream passes through a distribution system 20 to a manifold 22.

System 10 further includes a source 24 of the titania precursor 26. Source 24, like source 12, has an inlet 28 for a carrier gas that passes through precursor material 26 and entrains vapors thereof. Again, a bypass stream is introduced at 30, and the vaporous stream passes through a distribution system 32 to manifold 22.

The two vapor streams mix in manifold 22. The mixture passes through fume lines 34 to burners 36 mounted in the upper portion 38 of furnace 40. The mixed vapor stream is further joined with a fuel/oxygen mixture at burners 36. There it combusts and is oxidized to form silica-titania particles at a temperature in excess of 1600° C. The particles thus formed are directed at, and collect in, cup 42 of refractory furnace 40. There, they melt to form a solid boule shown as 44.

The present invention arose when efforts were made to convert the system and process from chloride precursors to the more environmentally friendly, metallo-organic precursor materials (OMCTS and titanium isopropoxide). The alkoxides of the transition metals were known to be sensitive to light, heat and moisture. It was also known that the metal alkoxides readily hydrolyze with moisture to form the hydroxide and oxide of the metal.

Accordingly, when white deposits built up in the vapor delivery system, it was suspected that moisture was the culprit. Thus, it was postulated that these reactions were occurring:

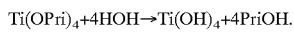
Ti(OPri)$_4$+4HOH→Ti(OH)$_4$+4PriOH.

Ti(OH)$_4$→TiO$_2$+2HOH.

This led to a search for a source of moisture.

Surprisingly, the silica precursor, OMCTS, was found to be the source of moisture. Accordingly, it has been found necessary to employ "dry" OMCTS in the present process. In particular, it has been necessary to maintain the water content in the OMCTS at less than 2 ppm. to inhibit the white, titania build-up in the system.

It has also been found necessary to carefully control temperature in the vapor distribution system. This is particularly true in the fume lines 34 between manifold 22 and burners 36. If these lines are too cold, vapors can condense in the line and disrupt flow. This situation is averted by exposing the fume lines to heat from the burners and the furnace crown.

If the temperature in the fume lines becomes too high, titanium isopropoxide tends to thermally decompose, thus forming oxide deposits in the line. The oxide deposits disrupt vapor flow and cause turbulence in the furnace atmosphere. As shown later, this contributes to other problems in the furnace.

To avoid this overheating problem, fume lines 34 are preferably insulated. For example, the lines may be clad with a highly conductive and reflective material such as aluminum foil.

It has been observed that crown 46 of furnace 40 runs hottest in its central area. As a result, a glassy condensate tends to develop in this area. In time, this condensate can build-up and form a stalactite-like shape. Ultimately, drippage onto the fused silica boule from this glassy stalactite can occur. This creates effects in the boule that must be removed by grinding. To avoid this expensive process, the boule lay-down cycle is shortened, thus adding to the cost of the operation.

At least two conditions have been found to aggravate development of the glassy condensate in the center of the crown. One condition is impurities in the refractory brick, especially alkali and alkaline earth metal impurities. As such impurities migrate from the brick, or the silica penetrates the brick, a less viscous, more fluid glass develops. This in turn more readily flows and drips onto the boule. This contributing factor can be minimized by employing pure materials in brick preparation; also by treatment of the furnace bricks to extract impurities prior to use of the furnace.

The other condition manifests itself within the furnace, but it is caused by conditions in the vapor delivery system. The condition is turbulence in the furnace due to eddy currents developed in the flame. A key to controlling turbulence has been found to be maintenance of smooth, vapor flow rates.

This requires more than mere inlet valve regulation and temperature control of the precursor materials. It has previously been explained that moisture must be essentially excluded to avoid dissociation of titanium alkoxide, and consequent buildup on the distribution system walls. It has been found that such buildup also creates erratic flow rates. These, in turn, cause turbulence in the furnace atmosphere.

Titanium alkoxides, particularly Ti(OPri)$_4$, are water white in a pure state, but degrade readily. This condition is exhibited by a discoloration in the material that proceeds from a pale yellow through amber to dark brown. The discoloration is due to such contaminates as higher order polymers, oxidation products, and trace elements. As the alkoxide degrades, its properties change. In particular, its vapor pressure changes. This alters the flow-rate and thereby causes turbulence as well as composition variation. The turbulence, as noted, aggravates the buildup of glass condensate in the center of the furnace crown.

An added benefit of using a pure titanium alkoxide is that it permits using higher temperatures in the precursor materials. The vapor pressure of the alkoxide increases with temperature, thus requiring a lower, carrier vapor flow rate. This lower flow rate contributes to a smoother operation and less turbulence.

In summary then, optimum production of a fused, SiO$_2$—TiO$_2$ glass product by flame hydrolysis is obtained by using a relatively pure, titania precursor and a relatively dry, silica precursor. Also, decomposition of the titania precursor should be avoided by controlling the temperature in the fume lines. Finally, the brick in the furnace, particularly in the crown portion, should be purified to minimize the occurrence of glass condensate at the crown hot spot.

We claim:

1. In a method of producing, by flame hydrolysis, a fused silica glass containing titania which comprises delivering a mixture of a silica precursor and a titania precursor in vapor form to a flame and, passing the mixture through the flame to form SiO$_2$—TiO$_2$ particles, the improvement which comprises maintaining the titania precursor in an essentially pure form while delivering it to the flame.

2. A method in accordance with claim 1 which comprises delivering, as the silica and titania precursors, a siloxane and a titanium alkoxide.

3. A method in accordance with claim 2 which comprises delivering octametylcyclotetrasiloxane and titanium isopropoxide to the flame as the silica and titania precursors.

4. A method in accordance with claim 2 which comprises delivering, as the silica precursor, a siloxane that contains less than 2 ppm. water.

5. A method in accordance with claim 2 which comprises delivering, as the silica precursor, a titanium alkoxide that is essentially colorless.

6. A method in accordance with claim 1 which comprises depositing the SiO$_2$—TiO$_2$ particles in a refractory brick furnace while minimizing turbulence in the furnace atmosphere during deposition.

7. A method in accordance with claim 6 which comprises maintaining steady, vapor flow rates during delivery of the precursors to the flame for hydrolysis.

8. A method in accordance with claim 1 which comprises avoiding decomposition or condensation of the titania precursor as it is delivered in vapor form to the flame.

9. A method in accordance with claim 8 which comprises maintaining the titanium precursor vapor at a temperature above its condensation point, but below its decomposition temperature, during its delivery to the flame for hydrolysis.

10. A method in accordance with claim 9 which comprises delivering the mixture of precursors through insulated fume lines to avoid overheating and decomposition of the titanium precursor.

11. A method in accordance with claim 10 which comprises delivering the precursors through fume lines insulated with a heat conducting and reflecting cladding.

12. A method in accordance with claim 11 which comprises delivering the precursors through fume lines clad with aluminum foil.

13. A method in accordance with claim 1 which comprises depositing the $SiO_2$—$TiO_2$ particles in a refractory brick furnace having a crown portion composed of purified brick to minimize the effect of silica condensate forming on the crown.

14. A method of producing, by flame hydrolysis, a fused silica glass containing titania which comprises separately delivering vapor streams from sources of a silica precursor that contains less than 2 ppm. water, and a titania precursor that is essentially colorless, mixing the vapor streams, delivering the mixture to burners through fume lines while maintaining steady, vapor flow rate by controlling temperature of the fume lines, passing the mixture through the flame to produce $SiO_2$—$TiO_2$ particles, depositing the particles in a refractory furnace having at least its crown portion composed of purified brick, and melting the particles as they are collected to form a solid body of fused silica.

* * * * *